US011918889B2

(12) United States Patent
Sakamoto et al.

(10) Patent No.: US 11,918,889 B2
(45) Date of Patent: Mar. 5, 2024

(54) DEVICE, FOR EXAMPLE VIDEO GAME DEVICE, PROVIDED WITH A CONTACTLESS TRANSPONDER

(71) Applicants: STMICROELECTRONICS KK, Tokyo (JP); STMICROELECTRONICS (ROUSSET) SAS, Rousset (FR)

(72) Inventors: Hirokazu Sakamoto, Toyko (JP); Anthony Tornambe, Rousset (FR)

(73) Assignees: STMICROELECTRONICS KK, Tokyo (JP); STMICROELECTRONICS (ROUSSET) SAS, Rousset (FR)

( * ) Notice: Subject to any disclaimer, the term of this patent is extended or adjusted under 35 U.S.C. 154(b) by 607 days.

(21) Appl. No.: 16/869,184

(22) Filed: May 7, 2020

(65) Prior Publication Data

US 2020/0360802 A1 Nov. 19, 2020

(30) Foreign Application Priority Data

May 14, 2019 (FR) ..................................... 1904998

(51) Int. Cl.
*A63F 13/24* (2014.01)
*A63F 13/235* (2014.01)

(52) U.S. Cl.
CPC ............ *A63F 13/24* (2014.09); *A63F 13/235* (2014.09)

(58) Field of Classification Search
None
See application file for complete search history.

(56) References Cited

U.S. PATENT DOCUMENTS

| 5,541,574 A | * | 7/1996 | Lowe | B60C 23/0413 340/447 |
| 7,758,424 B2 | * | 7/2010 | Riggs | A63F 13/285 341/20 |
| 2003/0030441 A1 | * | 2/2003 | Lam | H01H 13/70 324/426 |
| 2003/0061706 A1 | * | 4/2003 | Smeyak | H01Q 1/2225 29/601 |
| 2004/0204240 A1 | * | 10/2004 | Barney | A63J 21/00 463/36 |
| 2005/0143173 A1 | | 6/2005 | Barney et al. | |
| 2006/0154726 A1 | * | 7/2006 | Weston | A63F 13/32 463/36 |
| 2006/0205565 A1 | * | 9/2006 | Feldman | A63B 24/00 482/8 |
| 2006/0262090 A1 | * | 11/2006 | Higginson | G06F 3/03 345/161 |
| 2008/0309580 A1 | * | 12/2008 | Nakajima | H01Q 1/42 343/872 |

(Continued)

FOREIGN PATENT DOCUMENTS

JP 2003258965 A * 9/2003

*Primary Examiner* — Tramar Harper
(74) *Attorney, Agent, or Firm* — Seed IP Law Group LLP (57) ABSTRACT

A device comprising at least one controller handset possessing a housing and at least one control element that is arranged so as to protrude from the housing and to be movable with respect to the housing so as to allow a user to control at least one movement of at least one object that is external to the device, and a contactless transponder having at least one antenna that is housed in the at least one control element.

20 Claims, 6 Drawing Sheets

(56) References Cited

U.S. PATENT DOCUMENTS

| | | | |
|---|---|---|---|
| 2011/0283755 A1* | 11/2011 | Chen | G09F 3/0376 |
| | | | 70/158 |
| 2013/0100021 A1* | 4/2013 | Larsen | A63F 13/214 |
| | | | 345/161 |
| 2014/0274412 A1 | 9/2014 | Sabo et al. | |
| 2017/0048368 A1 | 2/2017 | Köhnke et al. | |
| 2018/0025264 A1 | 1/2018 | Maier et al. | |
| 2018/0185749 A1* | 7/2018 | Kidakarn | A63F 13/22 |
| 2018/0333641 A1* | 11/2018 | Strahle | A63F 13/24 |
| 2020/0086211 A1* | 3/2020 | Goerz | A63F 13/24 |
| 2020/0164269 A1* | 5/2020 | Palmer | A63F 13/22 |
| 2020/0353349 A1* | 11/2020 | Palmer | A63F 13/24 |
| 2021/0016161 A1* | 1/2021 | Albright | A63F 13/24 |
| 2021/0252386 A1* | 8/2021 | VanWyk | A63F 13/218 |
| 2021/0252388 A1* | 8/2021 | VanWyk | A63F 13/214 |
| 2021/0298872 A1* | 9/2021 | Pfleiderer | A61C 1/08 |

* cited by examiner

DEVICE, FOR EXAMPLE VIDEO GAME DEVICE, PROVIDED WITH A CONTACTLESS TRANSPONDER

BACKGROUND

Technical Field

Implementations and embodiments of the disclosure relate to devices, such as video game devices, game consoles or other devices, provided with one or more controller handsets fitted with one or more control elements, for example joysticks, and further including contactless transponders, in particular NFC (near-field communication) transponders, for example tags.

Description of the Related Art

Such transponders may operate in reader mode so as, in the case of video game devices, for example to read information on figurines that are themselves fitted with transponders (tags) for the purpose of selecting a character in the video game corresponding to said figurine.

The transponders with which these devices are fitted may also operate in card mode so as for example to allow an external reader to communicate information to the device.

When the device, for example a video game device, is fitted with a microcontroller, these transponders may serve as a gateway between for example the tag with which a figurine is fitted and the microcontroller so as to communicate the characteristics of the figurine to the microcontroller so that the microcontroller is able to activate the corresponding character in the game.

Such transponders serving as a gateway may also be called "dynamic transponders".

Near-field communication, better known to those skilled in the art under the name NFC, is a wireless connectivity technology that allows communication over a short distance, for example 10 cm, between electronic devices, such as for example contactless chip cards or tags, and readers.

NFC technology is particularly suitable for connecting any type of user device and allows fast and easy communication.

A contactless transponder is a transponder that is capable of exchanging information via an antenna with another contactless device, in accordance with a contactless communication protocol.

An NFC transponder, which is a contactless transponder, is a transponder that is compatible with NFC technology.

NFC technology is an open technological platform that has been standardized in the ISO/IEC 18092 and ISO/IEC 21481 standards, but incorporates numerous standards that already exist, such as for example the Type A and Type B protocols defined in the ISO-14443 standard, which may be communication protocols able to be used in NFC technology.

Contactless technology may also be used in RFID (Radiofrequency Identification) transponders that are compatible with the ISO 15693 and ISO 18000-3 standards.

Currently, placing a transponder in a game device leads to loss of radiofrequency performance, or even to interruptions in the radiofrequency communication with the transponder. Specifically, the antenna of the transponder is located in a metal-rich environment and the distance between the antenna and the other parts of the device may vary from one device to the next due to variation in the mass production of the devices.

The use of ferrite sheets has been proposed to overcome these problems but this has proven not to be enough.

BRIEF SUMMARY

One or more embodiments of the present disclosure incorporate a contactless transponder efficiently within a device provided with a controller handset, for example a video game device, so as to improve contactless communication or even to guarantee good contactless communication between the transponder and another, external contactless device, for example a tag with which a figurine is fitted.

The inventors have observed that an effective solution would include acting on the placement of the transponder antenna.

Thus, according to one aspect, what is proposed is a device, for example, but not limited to, a video game device, comprising:

at least one controller handset possessing a housing and at least one control element, for example a control button or joystick, that is arranged so as to protrude from the housing and to be movable with respect to the housing so as to allow a user, for example a player, to control at least one movement of at least one object that is external to the device, and a contactless transponder having at least one antenna that is housed in said at least one control element.

Placing the antenna in the control element allows the antenna to be removed from the metal-rich environment of the game device, thereby ensuring improved contactless communication with another contactless device, external to the device.

Furthermore, from one device to the next, the placement of the antenna in the control element stays substantially identical since the variation observed in mass production hardly affects, or does not affect, the production of the control element.

Additionally, using a control element that is already present within the game device for the placement of the antenna is highly economically advantageous since use is made of available space in an existing element without having to create an additional protruding element for the placement of the antenna.

The control of at least one movement of at least one object that is external to the device should be understood very broadly.

Specifically, in the case of a video game device, it may here be a matter of controlling the movement of a character in the video game visible on a screen or else of moving a cursor on said screen allowing a particular game and/or a particular character and/or a particular action to be selected.

When the device is not a game device, the object that is external to the device may be for example an articulated arm controlled by the control element.

According to one embodiment, said at least one control element possesses a free end and said at least one antenna is then advantageously housed at said free end.

As described above, said at least one control element may comprise a control button or joystick that is articulated to a base arranged in the housing.

Said at least one antenna may include a plurality of turns taking any, for example a circular, shape, preferably so as to match the shape of the free end of the control element.

According to one embodiment, the transponder further comprises a first interface that is coupled to said at least one antenna and a contactless component, for example an NFC controller, that is coupled to the first interface via an impedance-matching circuit.

The control element advantageously includes two first electrically conductive linking means, for example two metal tracks, possessing two first ends that are connected, respectively, to the terminals of the antenna and two second ends.

The device then further comprises two second electrically conductive linking means coupling the two second ends of the first linking means to the impedance-matching circuit.

According to one embodiment, the base of the control element may contain a first printed circuit board while the housing contains a second printed circuit board bearing the impedance-matching circuit and the contactless component of the transponder.

The second linking means may then include flexible connecting means that are connected between the two second ends of the first linking means and metal tracks from the first printed circuit board, which are electrically coupled to the impedance-matching circuit.

As a variant, the second linking means may comprise:

flexible connecting means that are connected between the two second ends of the first linking means and metal screws securing the base of the control element to the printed circuit board; and metal tracks that are connected to said screws and to the impedance-matching circuit.

According to one embodiment, the device may further include a processing unit, for example a microcontroller, and the transponder may comprise a communication interface, for example an I²C (inter-integrated circuit) interface, that is connected to the processing unit.

BRIEF DESCRIPTION OF THE SEVERAL VIEWS OF THE DRAWINGS

Other advantages and features of the disclosure will become apparent upon examining the detailed description of completely nonlimiting embodiments and the appended drawings, in which:

FIG. 1;
FIG. 2;
FIG. 3;
FIG. 4;
FIG. 5;
FIG. 6;
FIG. 7;
FIG. 8;
FIG. 9;
FIG. 10.

DETAILED DESCRIPTION

Figure 1:
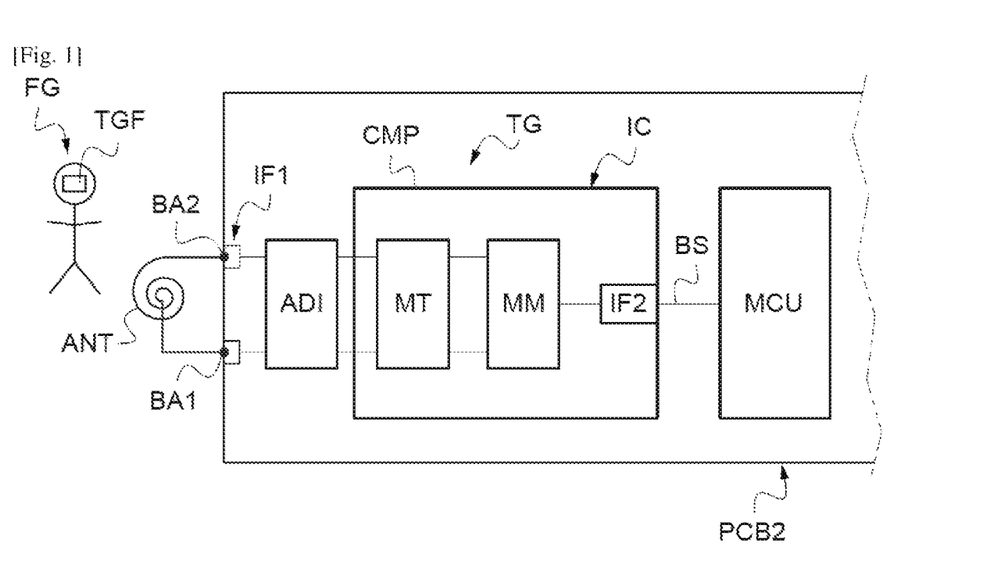

In FIG. 1, the reference TG denotes a contactless transponder. In this example, the transponder, used in reader mode, is configured to communicate with a figurine FG or an object fitted with another contactless transponder TGF, for example a tag, via its antenna ANT by using a carrier signal having a frequency of for example 13.56 MHz. The figurine or the object may be a statuette, a playing card, a packaging label, or any other object that can be fitted with a transponder The transponder TG is in this case a transponder that is capable of communicating in accordance with a contactless communication protocol that uses near-field communication (NFC) technology, for example.

This transponder TG, incorporated here within a video game device, is for example intended to read characteristics of the figurine that are stored in a memory of the transponder TGF so as to allow the player to play as a character corresponding to said figurine FG.

This transponder TG comprises an integrated circuit IC, for example an integrated circuit of the ST25 family marketed by STMicroelectronics.

The transponder TG includes two terminals AC0 and AC1 that are connected, respectively, to the two terminals of the antenna ANT.

The two terminals AC0 and AC1 in this case form a first contactless communication interface IF1 of the transponder.

The integrated circuit IC forms a contactless component CMP and also includes processing circuitry MT, including for example an energy recovery circuit, a microprocessor and/or a wired logic unit.

The processing circuitry MT are in particular configured to process the information received from the transponder TFG of the figurine.

The transponder TG also includes, as is conventional, an impedance-matching network ADI forming, with the antenna ANT 1, a resonant circuit at the carrier frequency, in this case 13.56 MHz.

The integrated circuit IC also includes a second communication interface IF2, in this case an I²C interface linked, by an I²C bus, referenced BS, to a processing unit external to the integrated circuit, referenced MCU, for example a microcontroller. As is conventional, the microcontroller MCU is the master device on the bus BS, and the communication interface IF2 is a slave device.

The microcontroller MCU is used in particular to manage and to control the video game.

A memory means MM is coupled between the processing circuitry MT and the second communication interface IF2.

The transponder TG is here a dynamic transponder acting as a gateway for the transmission of information from the figurine to the microcontroller MCU.

In other applications, the transponder TG may also act as a gateway for the transmission of information from the microcontroller MCU to another contactless device.

In NFC technology, information or data are generally transmitted in the form of frames, as is the case for example for the Type A protocol of the ISO-14443 standard.

The exchanged frames contain headers, data bits and parity bits.

The processing circuitry MT are therefore configured to extract, on reception, the data from the frames received from the figurine FG so as to write them to the memory means MM.

The microcontroller MCU is then configured to read these data from the memory means MM via the second communication interface IF2.

The transponder TG and the microcontroller MCU are borne by a printed circuit board bearing the reference PCB2.

The printed circuit board PCB2 is housed in a device DIS (FIG. 2), here a video game device.

Figure 2:
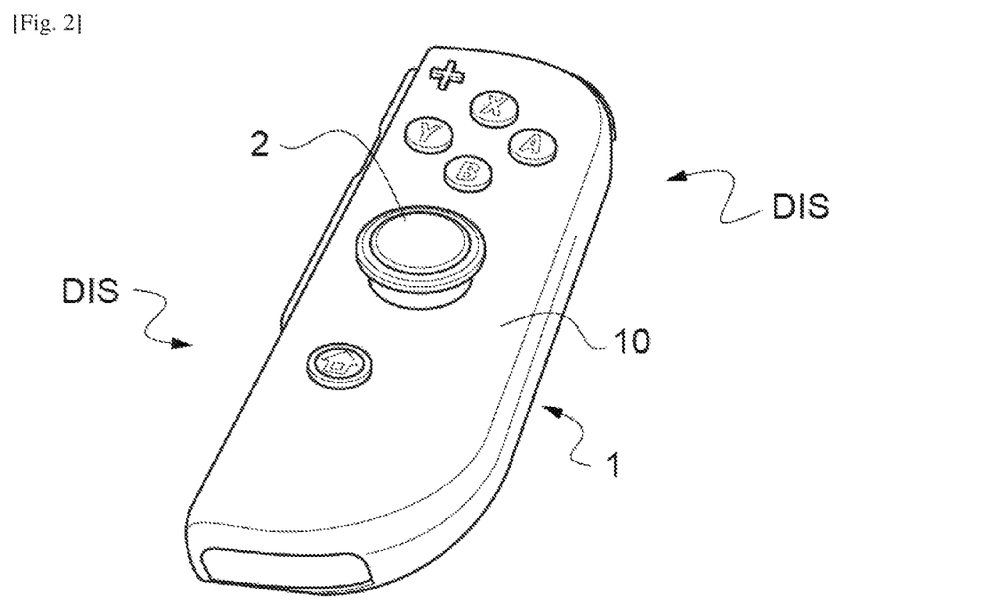

This device DIS here takes the form of a controller handset possessing a housing 1 having an upper face 10 from which a control element 2 protrudes.

Figure 3:
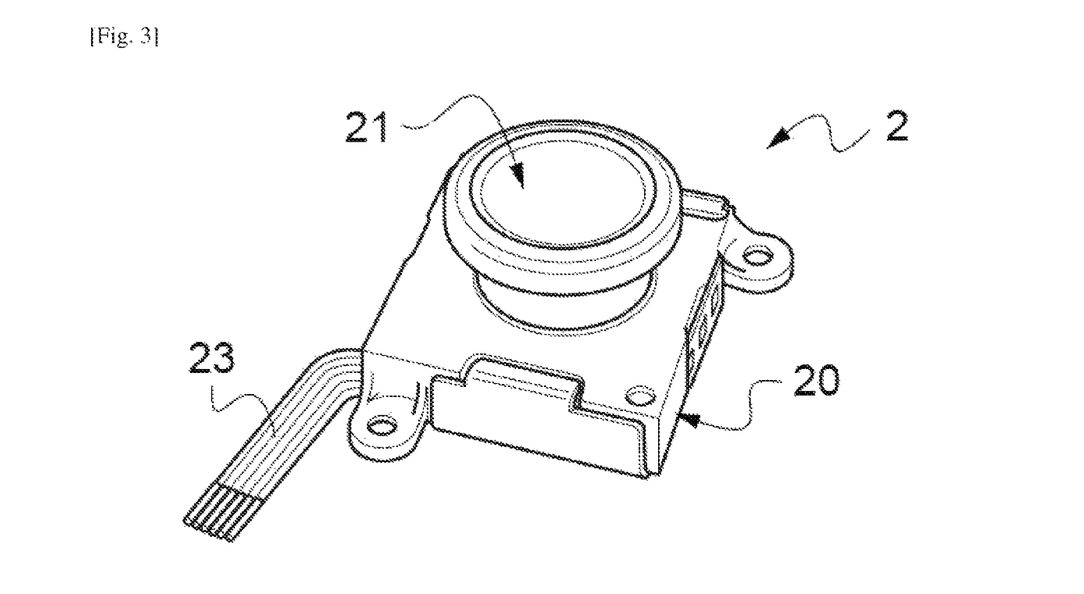

FIG. 3 shows an overall view of the control element 2.

It includes a base 20 and a joystick 21 that is articulated to and coupled to the base 20 so as to allow the movement of a character for example or the movement of a cursor on a screen, for example a screen of the video game device itself or a television screen for example, to be controlled. The joystick 21 may be referred to as a control member.

As will be seen in greater detail below, the control element 2 also includes a printed circuit board that is connected, by a connector 23, to the printed circuit board PCB2.

Figure 4:
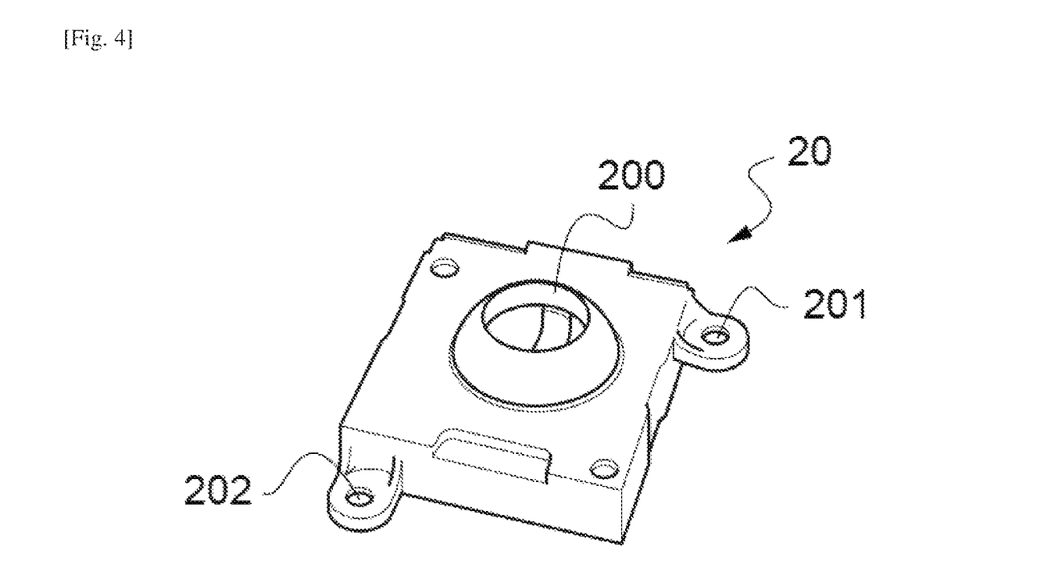

As illustrated in greater detail in FIG. 4, the base 20 of the control element includes here two lugs 201 and 202 that allow the base to be secured to the printed circuit board PCB2.

The base also includes a cavity 200 within which the joystick 21 articulates.

Figure 5:
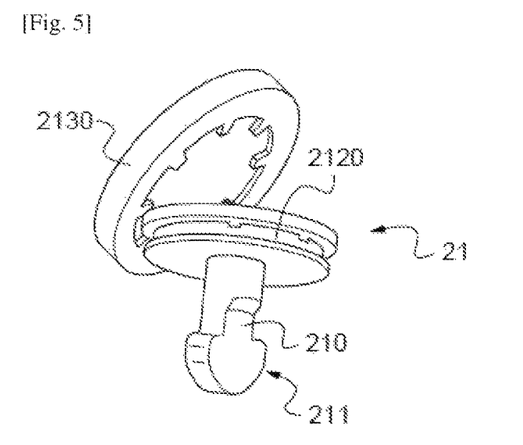

As illustrated in greater detail in FIG. 5, the joystick 21 includes a shaft 210 having a lower end 211 that cooperates with the cavity 200 in the base for the articulation of the joystick in three dimensions. The lower end 211 may be referred to as a first end of the joystick 21.

The joystick also includes, opposite the lower end 211, a free end, which is circular in shape, possessing here a groove 2120 covered with a cover 2130. The free end may be referred to as a second end of the joystick 21.

Additionally, as will be seen in greater detail below, this groove 2120 will house for example the antenna ANT of the transponder TG.

Figure 6:
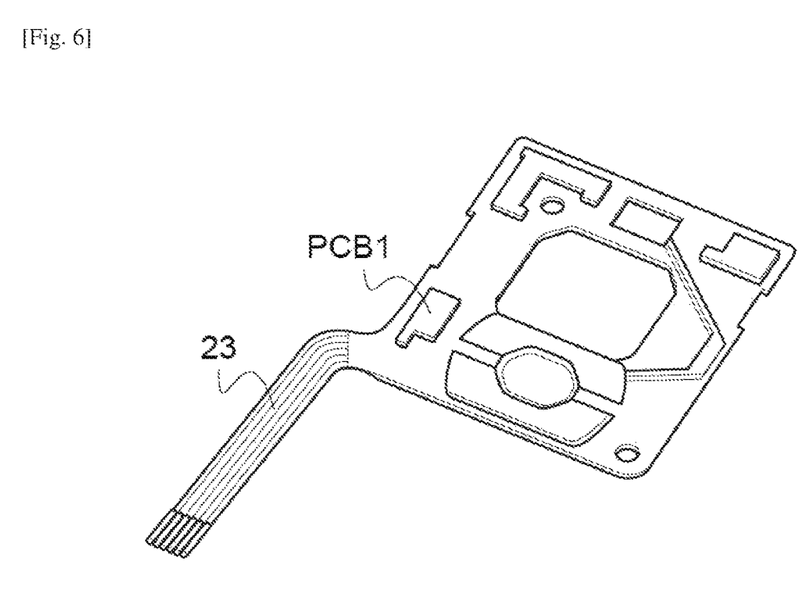

Lastly, as illustrated in FIG. 6 and as mentioned above, the control element 2 includes a printed circuit board PCB1 that is connected to the printed circuit board PCB2 by the connector 23.

Figure 7:
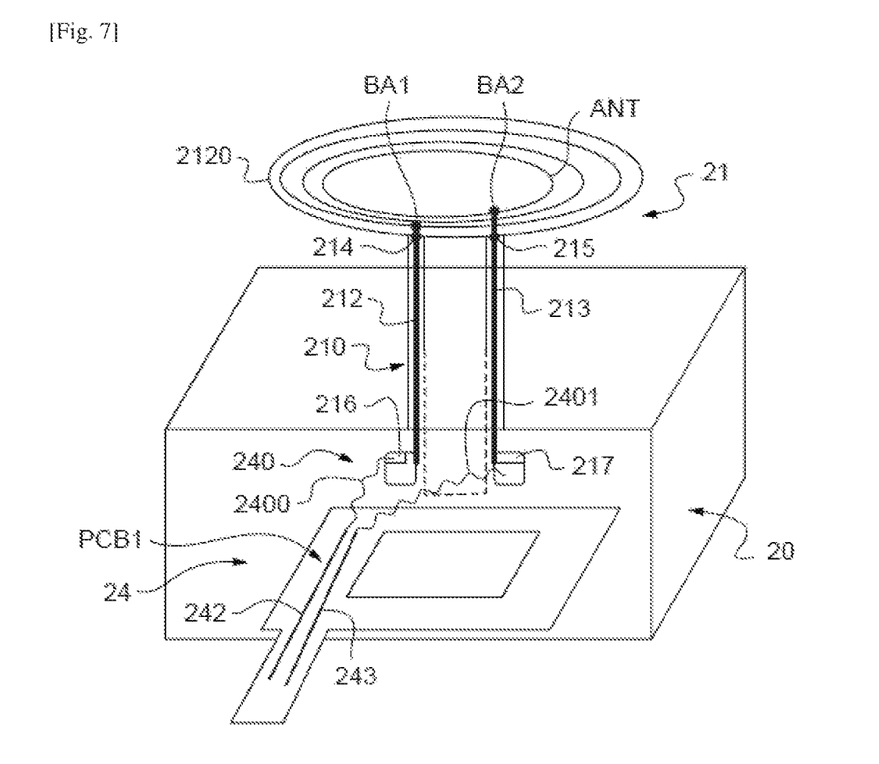

Reference is now made more particularly to FIG. 7, which schematically illustrates one exemplary configuration of the antenna ANT.

As mentioned above, the antenna ANT is housed in the groove 2120 that is located at the free end of the joystick 21.

This free end protrudes from the top of the housing 1 of the handset.

In the example illustrated here, the antenna ANT is circular and comprises a plurality of turns.

By way of nonlimiting indication, the diameter of the antenna is for example 1.6 cm. Its resistance at 13.56 MHz is 1 ohm and it has an induction value of about 500 nH.

Since the antenna ANT is located in the control element, it is away from the metal elements of the game device, thereby improving contactless communication while avoiding the use of ferrite sheets. Furthermore, using an element of the game device that is already present (the joystick) to house the antenna provides a cost saving.

The control element 2 includes here two first electrically conductive linking means 212 and 213. These two means 212 and 213 are, for example, metal tracks leading into the shaft 210 of the joystick 21 of the control element 2. The electrically conductive linking means 212, 213 may be referred to as electrical connectors.

These two metal tracks possess two first ends 214 and 215, respectively.

These two first ends 214 and 215 are connected, respectively, to the two terminals BA1 and BA2 of the antenna ANT.

The two tracks 212 and 213 further possess two second ends 216 and 217 that are located opposite the two first ends 214 and 215.

The device then further comprises two second electrically conductive linking means 24 coupling the two second ends 216 and 217 to the impedance-matching circuit ADI.

In the example described here, the second linking means 24 includes flexible connecting means 240, possessing here two flexible cables 2400, 2401, that are connected between the two second ends 216 and 217 and metal tracks 242 and 243 of the printed circuit board PCB1, these metal tracks 242 and 243 being connected to the interface IF1 of the board PCB2 and consequently to the impedance-matching circuit ADI of the transponder TG. The flexible connecting means 240 may be referred to as a flexible connector.

Figure 8:
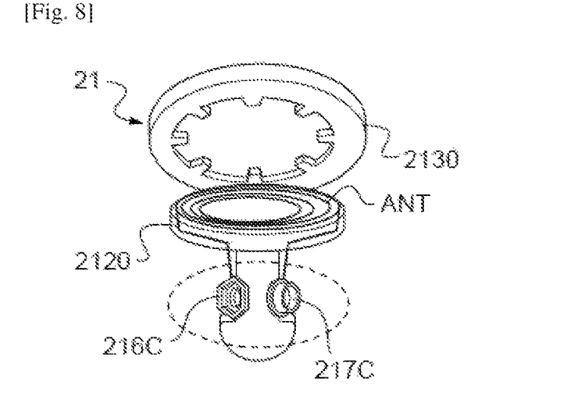

As shown more precisely in FIG. 8, the two second ends 216 and 217 may be provided with female and male connectors 216C and 217C. The female connector 216C has a first shape configured to receive a corresponding male connector with a second shape, and the male connector 217C has a third shape configured to receive a corresponding female connector with a fourth shape.

Figure 9:
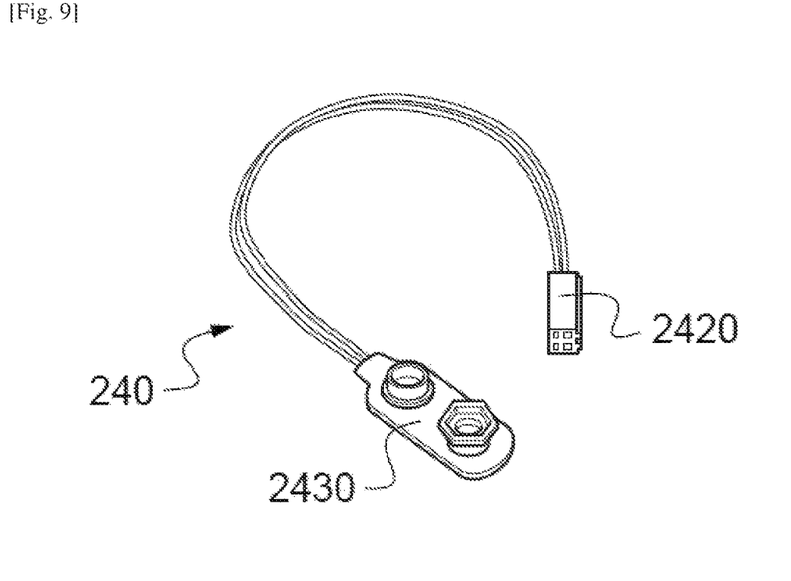

As illustrated in FIG. 9, the flexible connecting means 240 may themselves be fitted with a male and female connector 2430 that is intended to cooperate with the connectors 216C and 217C. The flexible connecting means 240 further include, at the other end, another connector 2420 that is intended to be connected to the printed circuit board PCB1 so as to cooperate with the metal tracks 242 and 243. The female connector 2430 has a first shape configured to receive a corresponding male connector with a second shape, and the male connector 2430 has a third shape configured to receive a corresponding female connector with a fourth shape.

Of course, the length of the flexible connecting means 240 is chosen so as to maintain an electrical connection while not hindering the movement of the joystick articulated to its base.

Figure 10:
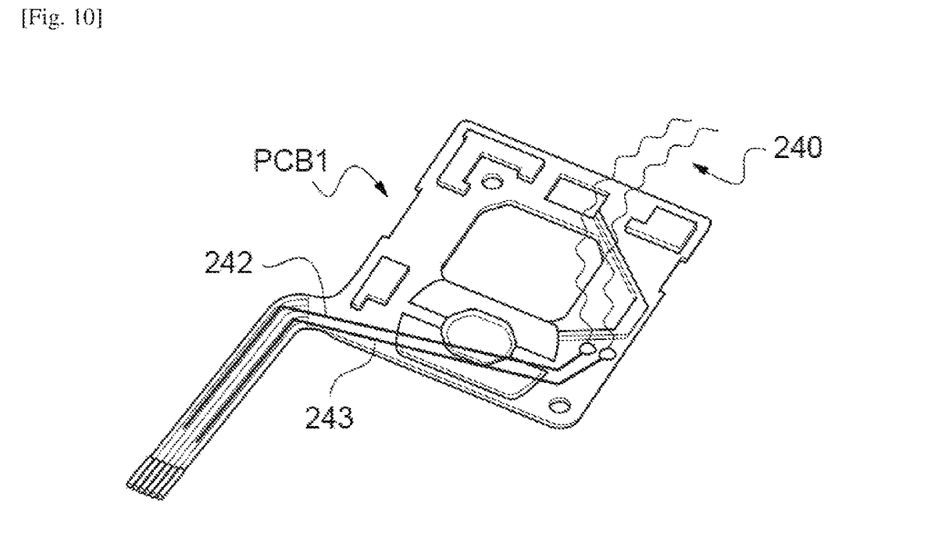

FIG. 10 is another schematic view showing the connection of the flexible connecting means 240 to the printed circuit board PCB1 and the metal tracks 242 and 243 that route to the printed circuit board PCB1.

The disclosure is not limited to the embodiments that have been described, but encompasses all variants.

Figure 11:
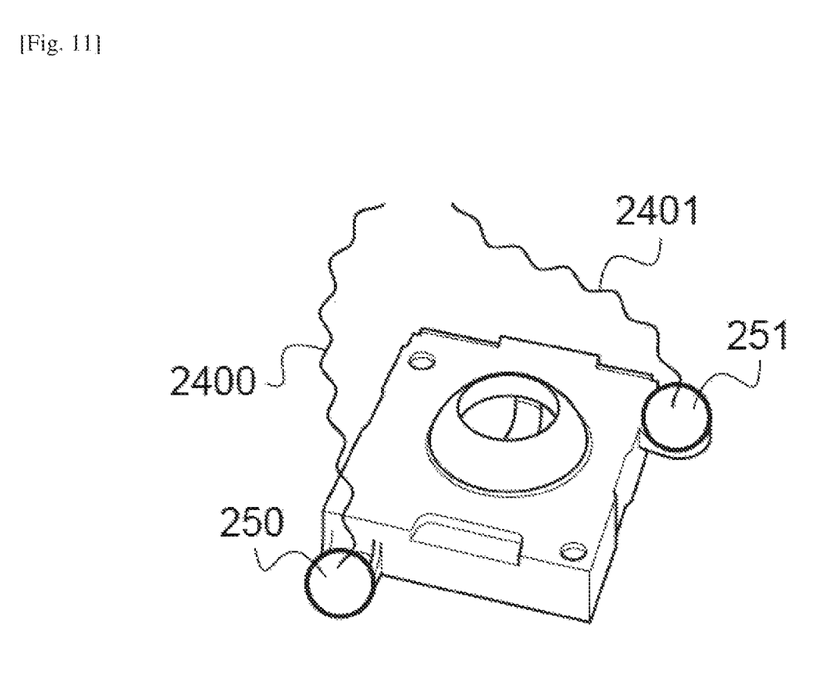
FIG. 11 schematically illustrate embodiments of the disclosure.

Thus, as illustrated in FIG. 11, it would be possible for the flexible connecting means 2400 and 2401, which are connected to the two second ends 216 and 217 of the first linking means, to be connected to electrically conductive securing screws 250 and 251. These securing screws allow the base 20 to be secured to the control element at the site of the lugs 201 and 202 (FIG. 4) and they come into contact with the metal tracks 242 and 243 so as to make an electrical connection from the antenna to the impedance-matching circuit.

Furthermore, although only one antenna has been shown, it would be possible for the handset 1 to include a plurality of antennas located, respectively, within a plurality of protruding elements. These antennas would then be connected in parallel and all linked to the impedance-matching circuit.

Furthermore, although the game device has been shown in this exemplary embodiment in the form of a handset, it would of course be possible for the device to include a console that is distinct from the handset including the control element.

The game device could also have a plurality of controller handsets.

The control element could also be a control button protruding from the housing of the controller handset.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
    a base;
    a joystick control member articulated to the base, the joystick control member configured to, in operation, articulate relative to the base to provide electrical inputs, and the joystick control member includes:
        a first end received by the base;
        a second end spaced apart from the first end; and
        a shaft extending between the first end and the second end, the shaft coupling the first end to the second end;
    a contactless transponder on the second end of the joystick control member, the contactless transponder including an antenna;
    a first conductive track having a first end coupled to the contactless transponder and a second end adjacent to the second end of the joystick control member; and
    a second conductive track having a first end coupled to the contactless transponder and a second end adjacent to the second end of the joystick control member.

2. The device according to claim 1, wherein the base includes a cavity that receives the first end of the joystick control member.

3. The device according to claim 1, wherein the second end of the joystick control member includes a groove that receives the antenna of the contactless transponder.

4. The device according to claim 3, wherein a cover covers the second end of the joystick control member and the antenna of the contactless transponder.

5. The device according to claim 1, further comprising:
    a printed circuit board including an electrically conductive track and housed in the base;
    an electrical connector coupled to the contactless transponder, the electrical connector extends along the shaft; and
    a flexible connector housed within the base, the flexible connector electrically coupled between the electrically conductive track of printed circuit board and the electrical connector.

6. The device according to claim 5, wherein the electrical connector includes a first end having a first shape and the flexible connector includes a second end with a second shape, the first end having the first shape is configured to be coupled to the second end having the second shape.

7. The device according to claim 1, wherein the antenna of the contactless transponder has a circular shape.

8. A device, comprising:
    a base;
    a joystick control member articulated to the base, the joystick control member including a first end, a second end opposite the first end, and a shaft coupling the first end to the second end, the joystick control member configured to, in operation, articulate with respect to the base to provide electrical inputs;
    a contactless transponder on the second end of the joystick control member;
    a first conductive track having a first end coupled to the contactless transponder and a second end adjacent to the second end of the joystick control member; and
    a second conductive track having a first end coupled to the contactless transponder and a second end adjacent to the second end of the joystick control member.

9. The device according to claim 8, wherein the second end of the first conductive track is coupled to a male connector and the second end of the second conductive track is coupled to a female connector.

10. The device according to claim 8, further comprising a groove in the second end of the joystick control member that receives an antenna of the contactless transponder.

11. The device according to claim 8, wherein the second end of the joystick control member is a free end of the joystick control member configured to, in operation, be freely articulated by a user to provide the electrical inputs.

12. The device of claim 8, wherein the contactless transponder is configured to, in operation, scan an RFID tag.

13. A device, comprising:
    a base;
    a joystick control member articulated to the base, the joystick control member including a first end, a second end opposite to the first end, and a shaft coupling the first end to the second end, the joystick control member configured to, in operation, articulate with respect to the base to provide electrical inputs;
    a contactless transponder on the second end of the joystick control member;
    a first conductive track having a first end coupled to the contactless transponder and a second end adjacent to the second end of the joystick control member;
    a second conductive track having a first end coupled to the contactless transponder and a second end adjacent to the second end of the joystick control member; and
    a cover on the second end of the joystick control member, and the cover covers an antenna of the contactless transponder.

14. The device of claim 13, wherein the second end of the joystick control member is a free end of the joystick control member configured to, in operation, be freely articulated by a user to provide the electrical inputs.

15. The device of claim 13, wherein:
    the joystick control member further includes a groove in the second end of the joystick control member; and
    the contactless transponder includes an antenna housed within the groove.

16. The device of claim 15, wherein the antenna includes a plurality of turns.

17. The device of claim 15, wherein the antenna of the contactless transponder is configured to scan an object fitted with another contactless transponder.

18. The device of claim 13, further comprising:
    a first connector at the first end of the joystick control member and coupled to the second end of the first conductive track; and
    a second connector at the first end of the joystick control member and coupled to the second end of the second conductive track.

19. The device of claim 18, wherein:
    the first connector is a female connector; and
    the second connector is a male connector.

20. The device of claim 13, wherein the joystick control member is a joystick shaft structure.

* * * * *